April 22, 1924.
W. D. LOWE
TOOL HOLDER
Filed Feb. 2, 1921
1,491,713
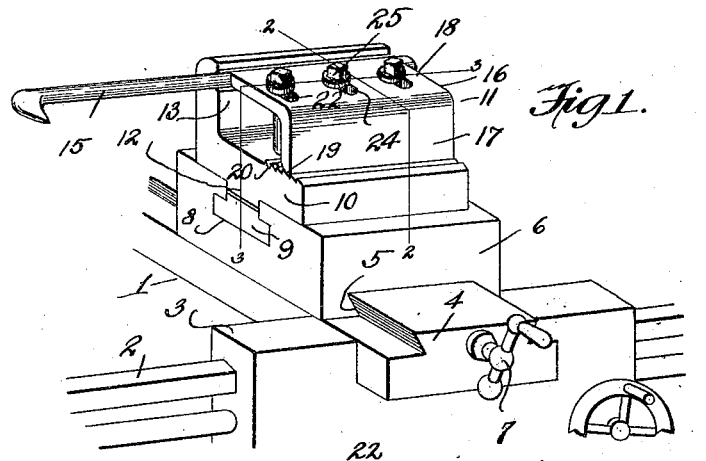
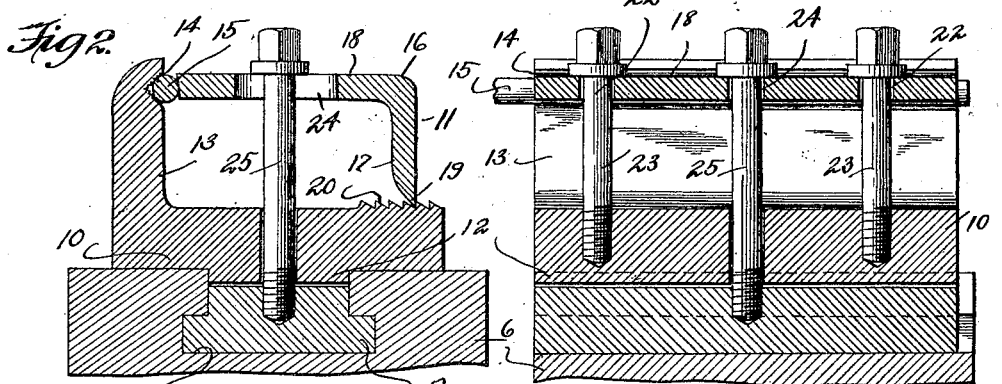
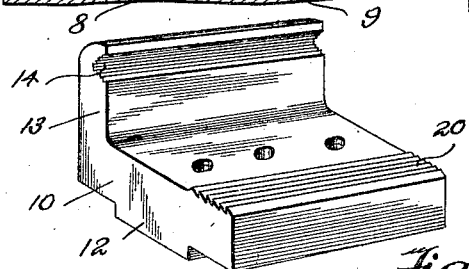
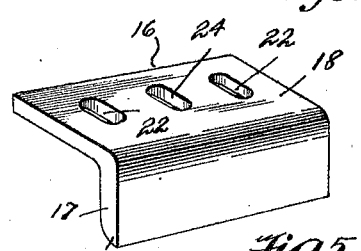
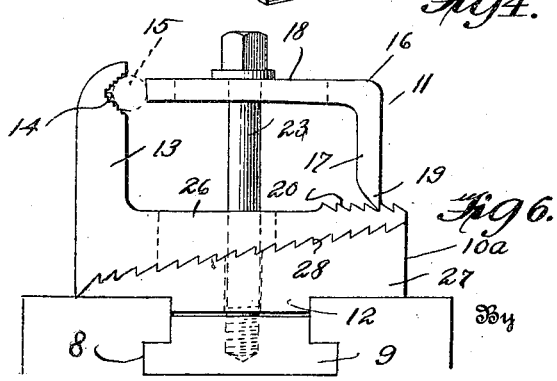
Inventor
Willard D. Lowe.
By C. C. Shepherd
Attorney Patented Apr. 22, 1924.

1,491,713

UNITED STATES PATENT OFFICE.

WILLARD D. LOWE, OF COLUMBUS, OHIO.

TOOL HOLDER.

Application filed February 2, 1921. Serial No. 441,756.

*To all whom it may concern:*

Be it known that WILLARD D. LOWE, a citizen of the United States, residing at Columbus, in the county of Franklin and State of Ohio, has invented certain new and useful Improvements in Tool Holders, of which the following is a specification.

This invention relates to an improvement in tool holders, and has for its primary object to provide a simple, positive and efficient holder adapted for use in conjunction with an ordinary metal working lathe for the purpose of enabling the rounded shanks of metal cutting tools or the like to be firmly and securely retained within the holder and to enable the same to be presented to the work in such manner that loss of adjustment will be precluded and the tool will be securely held in active position of operation, free from vibration and other influences which normally tend to diminish the effectiveness and accuracy in the operation of the tool.

Another object of the invention resides in a tool holder capable of longitudinally gripping the rounded shank of a tool and wherein the holder is formed to include a relatively stationary member and a movable jaw member, the latter being of angular formation, the stationary member being formed to include a substantially V shaped longitudinal groove capable of receiving one side of the tool or work to be clamped, and the said movable jaw member being situated so that its horizontal arm may be drawn into clamping engagement with that portion of the work opposite the groove, a bolt or screw connection being situated to force the angular jaw member downwardly into gripping engagement with the tool shank, and to enable the latter to be securely and frictionally gripped for a considerable longitudinal distance and held in an immovable and set position best adapted for accurate workmanship.

A further object of the invention resides in so mounting the tool holder as to permit the latter to be moved transversely and longitudinally of the lathe in order that any desired position of active operation may be readily assumed and maintained, the said holder embodying further features of construction whereby the height of the tool, when retained within the holder, may be raised or lowered.

For a further understanding of the invention, reference is to be had to the following description and to the accompanying drawing, in which similar characters of reference denote like and corresponding parts throughout the several views thereof.

In said drawings:

Figure 1 is a perspective view disclosing fragmentarily a portion of a lathe and illustrating the application of the improved work holder comprising the present invention thereto, Figure 2 is a transverse vertical sectional view taken along the plane disclosed by the line 2—2 of Figure 1, Figure 3 is a vertical longitudinal section taken along the plane disclosed by the line 3—3 of Figure 1, Figure 4 is a detail perspective view of the base member of the holder, Figure 5 is a similar view of the clamping member, and Figure 6 is a detail view disclosing a slightly modified form of the invention.

Referring more particularly to the details of the invention, the numeral 1 designates broadly a standard form of lathe of the type commonly found in machine shops or other metal working establishments. The lathe includes, as usual, a base or frame having longitudinal guide bars 2, upon which the usual sliding carriage 3 is mounted which is adapted to be longitudinally adjusted to various positions upon the lathe. The carriage in this instance is formed to include a substantially dove tailed flange 4, which extends transversely of the carriage and is adapted to pass through a similarly formed slot 5 provided in a base section 6, this base section is capable of being moved longitudinally of the carriage 3 upon the flange 4, and its movements are effected by the provision of a manually controlled screw 7.

The base section 6 is, in turn, equipped with a longitudinally extending dove tailed groove 8 in which is slidably mounted a substantially T shaped bar 9, the latter being adapted for cooperation with the relatively stationary jaw member 10 of the holder 11 comprising the present invention. The member 10 is preferably formed so that the same may be moved longitudinally upon the base section 6, and is provided with an integral depending rib 12, which is adapted to extend into the groove 8 for clamping and guiding cooperation with the bar 9. It will be observed that the jaw member includes an upstanding vertical wall 13, in which a longitudinally extending substantially V shaped groove 14 is produced, the said groove having its surfaces formed or having its walls formed to include stepped surfaces, in order that the said groove may be accurately fitted to tool shanks 15 of varying diameter. In order to retain the said shanks within the groove 14, the present invention makes use of a movable jaw member 16, which is of angular cross sectional formation and includes a vertical leg 17 and a substantially horizontal leg 18, the leg 17, as shown more clearly in Figure 2, includes a relatively beveled lower edge 19, which is adapted to engage with any one of a plurality of longitudinally extending teeth 20 provided upon the upper surface of the stationary jaw member 10. By this construction it will be apparent that the outer longitudinal edge of the horizontal leg 18 will be forced into engagement with the tool shank by a substantially rocking or fulcrumed movement, the edge 19 serving in the capacity of a pivot in order to allow the slightly beveled outer edge 21 of the leg 18 to be frictionally pressed into engagement with one side of the tool shank so as to force the latter into the groove 14. Then, when downwardly directed pressure is applied to the movable jaw member it will be manifest that the said tool shank will be securely gripped and effectually retained against displacement or vibration. It will also be noted that the movable jaw member 16 is capable of being transversely moved over the upper surface of the jaw member 10, and that its lower edge 19 may be moved selectively into engagement with any of the teeth 20. This feature permits the movable jaw member to frictionally engage with the same effectiveness tool shanks of varying diameter and thus adapts the holder to tools of broadly differing physical properties or sizes.

In order to draw the horizontal leg of the movable jaw member downwardly into clamping engagement with the tool shank, the said horizontal leg 18 is provided, contiguous to its ends, with transversely disposed slots 22, which are adapted to receive vertically disposed bolts 23, the latter being threaded, as shown in Figure 3, into the base of the stationary jaw member 10 and have their heads disposed above the leg 18. Manifestly, by tightening these bolts a very considerable pressure may be brought to play upon the side of the tool shank, and this pressure will be amply sufficient to securely hold the tool in connection with the holder. Also, the leg 18 is provided intermediately of the slots 22 with an intermediate slot 24, through which a bolt 25 passes, this bolt extends downwardly through an opening provided in the base of the stationary jaw member 10 and has its lower threaded end received within an opening provided in the bar 9, the arrangement of the bolt 25 being such that when the same is tightened, the bar 9 will be brought into frictional engagement with the edges of the groove 8 and also the member 10 will be forced downwardly into frictional engagement with the upper surface of the base section 6, thereby serving to hold the gripping members of the holder against longitudinal displacement. By this construction it will be apparent that tool shanks or other cylindrical stock of any description and of many varying sizes may be firmly and positively secured between the gripping members of the holder, and that the stock so gripped will be prevented from losing its adjustment or accidentally slipping from its applied position so long as the bolts 23 and 25 are capable of applying proper pressures. When thus held within the holder, the stock may be longitudinally shifted by either adjusting the positions of the jaw member 10 with respect to the base section 6, or by moving the whole structure bodily through the agency of the longitudinally adjustable carriage 3. Then, transverse adjustments may be effected by reason of the screw construction 7, which will operate to shift the base section 6 transversely of the lathe and to effect consequent adjutments in the positions of the stock gripped between the jaw members 10 and 16. The parts of the holder are thus capable of being quickly and easily adjusted to assume any desired operative position and to adapt the holder to stock of varying diameter.

In the modification disclosed in Figure 6 the stationary jaw member 10ª is formed to include separable upper and lower sections 26 and 27 respectively, the said section 27 being substantially wedged shaped in cross-section to conform with the construction of the lower portion of the upper section, the said sections thereby presenting inclined abutting surfaces. By this construction it will be apparent that the upper section may, by lateral adjustment with respect to the lower section, be raised or lowered in order that the height of the tools or stock gripped thereby may be altered. Preferably, the inclined abutting surfaces of the sections 26 and 27 are provided with interlocking teeth 28 which operate, when the said sections are clamped together by the bolts 23 and 25, to prevent relative separation of the said sections. This vertical adjustment on the part of the jaw member 10 is highly desirable in that the working height of the tools gripped thereby may be easily and accurately adjusted to produce high standards of workmanship. In view of the foregoing it is believed that the operation and construction of the holder will be readily understood by those versed in the art, and therefore a more extended explanation relative to the operation and construction thereof has been accordingly omitted.

What is claimed is:

1. A tool holder comprising a relatively stationary clamping member, said member including a base portion, a substantially upstanding vertical wall, said wall having a longitudinal groove provided in one face thereof capable of receiving a cylindrical tool shank, a movable clamping member of angular formation and formed to include a vertical and a horizontal leg, said vertical leg being disposed in engagement with the upper surface of the base portion of said stationary clamping member, and said horizontal leg being disposed for rocking engagement with the tool shank located in said groove, and fastening means for maintaining said movable clamping member in engagement with the tool shank.

2. A tool holder comprising a base member, said base member being formed to include a longitudinally extending groove capable of removably receiving substantially cylindrical bodies, a movable clamping member of angular cross sectional formation mounted for rocking movement upon said base member, whereby the free end of said movable member will be capable of frictionally engaging the body positioned in said groove, and securing devices arranged to pass through said clamping member between the free and the fulcrumed edge portions thereof and cooperative with said base member, whereby upon the tightening of said devices said movable member will be oscillated to force the free end thereof into gripping engagement with a body positioned within said groove.

3. A tool holder comprising a base member, said base member being formed to include a longitudinally extending groove capable of removably receiving cylindrical bodies, a movable clamping member formed to include horizontal and vertical leg portions, the said vertical leg portions having its lower edge disposed for engagement with one of a plurality of longitudinal shoulders provided upon said base member, whereby the horizontal leg portion may be adjusted relatively to the groove provided in said base member, and threaded securing devices arranged to pass through the horizontal leg of said clamping member and to be threaded into openings provided in said base member, whereby upon the tightening of said devices said movable member will be oscillated into gripping engagement with the side of a body positioned within said groove.

In testimony whereof I affix my signature.

WILLARD D. LOWE.